United States Patent
Rajaram et al.

(10) Patent No.: US 10,618,003 B2
(45) Date of Patent: Apr. 14, 2020

(54) NOBLE METAL-MOLECULAR SIEVE CATALYSTS

(71) Applicant: Johnson Matthey Public Limited Company, London (GB)

(72) Inventors: Raj Rao Rajaram, Slough (GB); Fiona-Mairead McKenna, Storrington (GB); Hai-Ying Chen, Conshohocken, PA (US); Dongxia Liu, Wayne, PA (US)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 14/563,382

(22) Filed: Dec. 8, 2014

(65) Prior Publication Data
US 2015/0157982 A1 Jun. 11, 2015

Related U.S. Application Data

(60) Provisional application No. 61/912,839, filed on Dec. 6, 2013.

(51) Int. Cl.
| | | |
|---|---|---|
| *B01D 53/94* | (2006.01) | |
| *B01J 37/02* | (2006.01) | |
| *B01J 29/44* | (2006.01) | |
| *B01J 29/80* | (2006.01) | |
| *B01J 29/74* | (2006.01) | |
| *B01J 29/068* | (2006.01) | |

(52) U.S. Cl.
CPC ..... *B01D 53/9486* (2013.01); *B01D 53/9459* (2013.01); *B01D 53/9481* (2013.01); *B01J 29/068* (2013.01); *B01J 29/44* (2013.01); *B01J 29/743* (2013.01); *B01J 29/7415* (2013.01); *B01J 29/80* (2013.01); *B01J 37/0201* (2013.01); *B01J 37/0244* (2013.01); *B01J 37/0246* (2013.01); *B01D 2255/1021* (2013.01); *B01D 2255/1023* (2013.01); *B01D 2255/50* (2013.01); *Y02T 10/22* (2013.01)

(58) Field of Classification Search
None
See application file for complete search history.

(56) References Cited

U.S. PATENT DOCUMENTS

| | | | |
|---|---|---|---|
| RE34,804 E | 12/1994 | Lachman et al. | |
| 5,492,883 A | 2/1996 | Wu | |
| 5,565,394 A | 10/1996 | Lachman et al. | |
| 5,603,216 A * | 2/1997 | Guile | F01N 3/0814 60/288 |
| 5,633,217 A | 5/1997 | Lynn | |
| 5,656,244 A | 8/1997 | Cole | |
| 6,093,378 A * | 7/2000 | Deeba | B01D 53/945 423/213.5 |
| 6,147,023 A | 11/2000 | Hirayama et al. | |
| 6,248,684 B1 * | 6/2001 | Yavuz | B01D 53/864 502/64 |
| 6,500,392 B2 | 12/2002 | Mizuno et al. | |
| 8,092,767 B2 | 1/2012 | Pollington et al. | |
| 9,528,413 B2 | 12/2016 | Katare et al. | |
| 9,616,420 B2 | 4/2017 | Chandler et al. | |
| 2002/0057997 A1 * | 5/2002 | Mizuno | B01D 53/945 422/171 |
| 2004/0040287 A1 * | 3/2004 | Beutel | B01D 53/9454 60/285 |
| 2008/0159936 A1 | 7/2008 | Zones et al. | |
| 2010/0029467 A1 | 2/2010 | Inui et al. | |
| 2010/0092358 A1 * | 4/2010 | Koegel | B01D 53/944 423/213.5 |
| 2011/0005200 A1 | 1/2011 | Gandhi et al. | |
| 2012/0037342 A1 | 2/2012 | Holloway et al. | |
| 2012/0189518 A1 | 7/2012 | Andersen et al. | |
| 2012/0308439 A1 | 12/2012 | Chen et al. | |
| 2013/0136677 A1 | 5/2013 | Chandler et al. | |
| 2013/0149222 A1 | 6/2013 | Blakeman et al. | |
| 2014/0161695 A1 * | 6/2014 | Hilgendorff | B01J 37/0244 423/213.5 |

FOREIGN PATENT DOCUMENTS

| | | |
|---|---|---|
| EP | 0868940 A1 | 10/1998 |
| EP | 1027919 A2 | 8/2000 |
| JP | 2002295247 A | 10/2002 |
| RU | 2108864 C1 | 4/1998 |
| WO | 98/50151 A1 | 11/1998 |
| WO | 2004076829 A1 | 9/2004 |
| WO | 2008047170 A1 | 4/2008 |
| WO | 2011064666 A2 | 6/2011 |
| WO | 2014083045 A1 | 6/2014 |

* cited by examiner

Primary Examiner — Sheng H Davis

(57) ABSTRACT

Exhaust gas catalysts are disclosed. One exhaust gas catalyst comprises a noble metal and a molecular sieve, and has an infrared spectrum having a characteristic absorption peak from 750 cm$^{-1}$ to 1050 cm$^{-1}$ in addition to the absorption peaks for the molecular sieve itself. The exhaust gas catalyst also comprises a noble metal and a molecular sieve, having greater than 5 percent of the noble metal amount located inside pores of the molecular sieve. The exhaust gas catalyst also comprises a first and second molecular sieve catalyst. The first molecular sieve catalyst comprises a first noble metal and a first molecular sieve, and the second molecular sieve catalyst comprises a second noble metal and a second molecular sieve. The first and second molecular sieves are different. The invention also includes exhaust systems comprising the exhaust gas catalysts, and a method for treating exhaust gas utilizing the exhaust gas catalysts.

16 Claims, No Drawings

NOBLE METAL-MOLECULAR SIEVE CATALYSTS

FIELD OF THE INVENTION

The invention relates to exhaust gas catalysts and their use in an exhaust system for internal combustion engines.

BACKGROUND OF THE INVENTION

Internal combustion engines produce exhaust gases containing a variety of pollutants, including nitrogen oxides ("$NO_x$"), carbon monoxide, and uncombusted hydrocarbons, which are the subject of governmental legislation. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

For instance, current urea based selective catalytic reduction (SCR) applications implemented for meeting Euro 6b emissions require that the temperature at the urea dosing position be above about 180° C. before urea can be dosed and used to convert $NO_x$. $NO_x$ conversion below 180° C. is difficult to address using the current systems, and future European and US legislation will stress the low temperature $NO_x$ storage and conversion. Currently this is achieved by heating strategies but this has a detrimental effect of $CO_2$ emissions.

As even more stringent national and regional legislation lowers the amount of pollutants that can be emitted from diesel or gasoline engines, reducing emissions during the cold start period is becoming a major challenge. Thus, methods for reducing the level of $NO_x$ emitted during cold start condition continue to be explored.

For instance, U.S. Appl. Pub. No. 2012/0308439 teaches a cold start catalyst that comprises (1) a zeolite catalyst comprising a base metal, a noble metal, and a zeolite, and (2) a supported platinum group metal catalyst comprising one or more platinum group metals and one or more inorganic oxide carriers.

PCT Intl. Appl. WO 2008/047170 discloses a system wherein $NO_x$ from a lean exhaust gas is adsorbed at temperatures below 200° C. and is subsequently thermally desorbed above 200° C. The $NO_x$ adsorbent is taught to consist of palladium and a cerium oxide or a mixed oxide or composite oxide containing cerium and at least one other transition metal.

U.S. Appl. Pub. No. 2011/0005200 teaches a catalyst system that simultaneously removes ammonia and enhances net $NO_x$ conversion by placing an ammonia-selective catalytic reduction ("$NH_3$—SCR") catalyst formulation downstream of a lean $NO_x$ trap. The $NH_3$—SCR catalyst is taught to adsorb the ammonia that is generated during the rich pulses in the lean $NO_x$ trap. The stored ammonia then reacts with the $NO_x$ emitted from the upstream lean $NO_x$ trap, which increases $NO_x$ conversion rate while depleting the stored ammonia.

PCT Intl. Appl. WO 2004/076829 discloses an exhaust-gas purification system which includes a $NO_x$ storage catalyst arranged upstream of an SCR catalyst. The $NO_x$ storage catalyst includes at least one alkali, alkaline earth, or rare earth metal which is coated or activated with at least one platinum group metal (Pt, Pd, Rh, or Ir). A particularly preferred $NO_x$ storage catalyst is taught to include cerium oxide coated with platinum and additionally platinum as an oxidizing catalyst on a support based on aluminum oxide. EP 1027919 discloses a $NO_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

As with any automotive system and process, it is desirable to attain still further improvements in exhaust gas treatment systems, particularly under cold start conditions. We have discovered an exhaust gas catalyst and system that can reduce cold start emissions during the low temperature period. The new exhaust gas catalyst also exhibits improved sulfur tolerance.

SUMMARY OF THE INVENTION

The invention is exhaust gas catalysts that are effective to adsorb $NO_x$ and hydrocarbons (HC) at or below a low temperature and to convert and release the adsorbed $NO_x$ and HC at temperatures above the low temperature. One exhaust gas catalyst comprises a noble metal and a molecular sieve, and has an infrared spectrum having a characteristic absorption peak in a range of from 750 $cm^{-1}$ to 1050 $cm^{-1}$ in addition to the absorption peaks for the molecular sieve itself. The exhaust gas catalyst also comprises a noble metal and a molecular sieve, having greater than 5 percent of the noble metal amount located inside pores of the molecular sieve. The exhaust gas catalyst also comprises a first and second molecular sieve catalyst. The first molecular sieve catalyst comprises a first noble metal and a first molecular sieve, and the second molecular sieve catalyst comprises a second noble metal and a second molecular sieve, wherein the first and second molecular sieves are different. The invention also includes exhaust systems comprising the exhaust gas catalysts, and a method for treating exhaust gas utilizing the exhaust gas catalysts.

DETAILED DESCRIPTION OF THE INVENTION

The exhaust gas catalysts of the invention are effective to adsorb $NO_x$ and hydrocarbons (HC) at or below a low temperature and to convert and release the adsorbed $NO_x$ and HC at temperatures above the low temperature. Preferably, the low temperature is in the range of about 200° C. to 250° C., more preferably about 200° C.

One exhaust gas catalyst of the invention comprises a noble metal and a molecular sieve. The exhaust gas catalyst has an infrared (IR) spectrum having a characteristic absorption peak in a range of from 750 $cm^{-1}$ to 1050 $cm^{-1}$, more preferably in the range of from 800 $cm^{-1}$ to 1000 $cm^{-1}$, or in the range of from 850 $cm^{-1}$ to 975 $cm^{-1}$. This characteristic absorption peak is in addition to the absorption peaks for an IR spectrum of the molecular sieve itself (i.e., the unmodified molecular sieve).

In another embodiment, the exhaust gas catalyst of the invention comprises a noble metal and a molecular sieve, wherein some of the noble metal (more than 1 percent of the total noble metal added) in the exhaust gas catalyst is located inside the pores of the molecular sieve. Preferably, more than 5 percent of the total amount of noble metal is located inside the pores of the molecular sieve; and more preferably may be greater than 10 percent or greater than 25% or greater than 50 percent of the total amount of noble metal that is located inside the pores of the molecular sieve.

In another embodiment, the exhaust gas catalyst of the invention comprises a noble metal and a molecular sieve, and has an infrared (IR) spectrum having a characteristic absorption peak in a range of from 750 cm$^{-1}$ to 1050 cm$^{-1}$, (more preferably in the range of from 800 cm$^{-1}$ to 1000 cm$^{-1}$, or in the range of from 850 cm$^{-1}$ to 975 cm$^{-1}$.), and some of the noble metal (more than 1 percent of the total noble metal added, and preferably more than 5 percent of the total noble metal added) in the exhaust gas catalyst is located inside the pores of the molecular sieve. More preferably, greater than 10 percent or greater than 25% or greater than 50 percent of the total amount of noble metal is located inside the pores of the molecular sieve.

The noble metal is preferably palladium, platinum, rhodium, gold, silver, iridium, ruthenium, osmium, or mixtures thereof; more preferably, palladium, platinum, rhodium, or mixtures thereof. Palladium is particularly preferred.

The molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons.

Preferably, the molecular sieve is selected from an aluminosilicate molecular sieve, a metal-substituted aluminosilicate molecular sieve, an aluminophosphate molecular sieve, or a metal-substituted aluminophosphate molecular sieve.

Preferably, the molecular sieve is a small pore molecular sieve having a maximum ring size of eight tetrahedral atoms, a medium pore molecular sieve having a maximum ring size of ten tetrahedral atoms, or a large pore molecular sieve having a maximum ring size of twelve tetrahedral atoms.

If the molecular sieve is a small pore molecular sieve, it is preferably a molecular sieve having the Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, as well as mixtures or intergrowths of any two or more. More preferably, the small pore zeolite is AEI or CHA. Particularly preferred intergrowths of the small pore molecular sieves include KFI-SIV, ITE-RTH, AEW-UEI, AEI-CHA, and AEI-SAV. Most preferably, the small pore molecular sieve is AEI or CHA, or an AEI-CHA intergrowth.

If the molecular sieve is a medium pore molecular sieve, it is preferably a molecular sieve having the Framework Type of MFI, FER, MWW, or EUO. If the molecular sieve is a large pore molecular sieve, it is preferably a molecular sieve having the Framework Type of CON, BEA, FAU, MOR, or EMT.

The exhaust gas catalyst may be prepared by any known means. For instance, the noble metal may be added to the molecular sieve to form the exhaust gas catalyst by any known means, the manner of addition is not considered to be particularly critical. For example, a noble metal compound (such as palladium nitrate) may be supported on the molecular sieve by impregnation, adsorption, ion-exchange, incipient wetness, precipitation, or the like. Other metals may also be added to the exhaust gas catalyst.

Preferably, the exhaust gas catalyst further comprises a flow-through substrate or filter substrate. In one embodiment, the exhaust gas catalyst is coated onto the flow-through or filter substrate, and preferably deposited on the flow-through or filter substrate using a washcoat procedure to produce an exhaust gas catalyst system.

The flow-through or filter substrate is a substrate that is capable of containing catalyst components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The exhaust gas catalyst may be added to the flow-through or filter substrate by any known means. A representative process for preparing the exhaust gas catalyst using a washcoat procedure is set forth below. It will be understood that the process below can be varied according to different embodiments of the invention.

The pre-formed exhaust gas catalyst may be added to the flow-through or filter substrate by a washcoating step. Alternatively, the exhaust gas catalyst may be formed on the flow-through or filter substrate by first washcoating unmodified molecular sieve onto the substrate to produce a molecular sieve-coated substrate. Noble metal may then be added to the molecular sieve-coated substrate, which may be accomplished by an impregnation procedure, or the like.

The washcoating procedure is preferably performed by first slurrying finely divided particles of the exhaust gas catalyst (or unmodified molecular sieve) in an appropriate solvent, preferably water, to form the slurry. Additional components, such as transition metal oxides, binders, stabilizers, or promoters may also be incorporated in the slurry as a mixture of water soluble or water-dispersible compounds. The slurry preferably contains between 10 to 70 weight percent solids, more preferably between 20 to 50 weight percent. Prior to forming the slurry, the exhaust gas catalyst (or unmodified molecular sieve) particles are preferably subject to a size reduction treatment (e.g., milling) such that the average particle size of the solid particles is less than 20 microns in diameter.

The flow-through or filter substrate may then be dipped one or more times into the slurry or the slurry may be coated on the substrate such that there will be deposited on the substrate the desired loading of catalytic materials. If noble metal is not incorporated into the molecular sieve prior to washcoating the flow-through or filter substrate, the molecular sieve-coated substrate is typically dried and calcined and then, the noble metal may be added to the molecular sieve-coated substrate by any known means, including impregnation, adsorption, or ion-exchange, for example, with a noble metal compound (such as palladium nitrate). Preferably, the entire length of the flow-through or filter substrate is coated with the slurry so that a washcoat of the exhaust gas catalyst covers the entire surface of the substrate.

After the flow-through or filter substrate has been coated with the exhaust gas catalyst, and impregnated with noble metal if necessary, the coated substrate is preferably dried and then calcined by heating at an elevated temperature to form the exhaust gas catalyst-coated substrate. Preferably, the calcination occurs at 400 to 600° C. for approximately 1 to 8 hours.

In an alternative embodiment, the flow-through or filter substrate is comprised of the exhaust gas catalyst. In this case, the exhaust gas catalyst is extruded to form the flow-through or filter substrate. The exhaust gas catalyst extruded substrate is preferably a honeycomb flow-through monolith.

Extruded molecular sieve substrates and honeycomb bodies, and processes for making them, are known in the art. See, for example, U.S. Pat. Nos. 5,492,883, 5,565,394, and 5,633,217 and U.S. Pat. No. Re. 34,804. Typically, the molecular sieve material is mixed with a permanent binder such as silicone resin and a temporary binder such as methylcellulose, and the mixture is extruded to form a green honeycomb body, which is then calcined and sintered to form the final molecular sieve flow-through monolith. The molecular sieve may contain the noble metal prior to extruding such that an exhaust gas catalyst monolith is produced by the extrusion procedure. Alternatively, the noble metal may be added to a pre-formed molecular sieve monolith in order to produce the exhaust gas catalyst monolith.

In a separate embodiment, the exhaust gas catalyst comprises a first molecular sieve catalyst and a second molecular sieve catalyst. The first molecular sieve catalyst comprises a first noble metal and a first molecular sieve. The second molecular sieve catalyst comprises a second noble metal and a second molecular sieve. The first and second molecular sieves are different. In this embodiment, the exhaust gas catalyst may comprise one or more additional molecular sieve catalysts (e.g., a third molecular sieve catalyst and/or a fourth molecular sieve catalyst), provided that the additional molecular sieve(s) are different than the first and second molecular sieves.

The first noble metal and the second noble metal are independently selected from platinum, palladium, rhodium, gold, silver, iridium, ruthenium, osmium, or mixtures thereof; preferably, they are independently selected from palladium, platinum, rhodium, or mixtures thereof. More preferably, the first noble metal and the second noble metal are both palladium.

The first molecular sieve is preferably a small pore molecular sieve having the Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, as well as mixtures or intergrowths of any two or more. More preferably, the small pore zeolite is AEI or CHA. Particularly preferred intergrowths of the small pore molecular sieves include KFI-SIV, ITE-RTH, AEW-UEI, AEI-CHA, and AEI-SAV. Most preferably, the small pore molecular sieve is AEI or CHA, or an AEI-CHA intergrowth.

The second molecular sieve is preferably a medium or large pore molecular sieve. The medium pore molecular sieve is preferably a molecular sieve having the Framework Type of MFI, FER, MWW, or EUO. The large pore molecular sieve is preferably a molecular sieve having the Framework Type of CON, BEA, FAU, MOR, or EMT. More preferably, the medium or large pore molecular sieve is MFI or BEA.

The exhaust gas catalyst may be prepared by processes well known in the prior art. The first molecular sieve catalyst and the second molecular sieve catalyst may be physically mixed to produce the exhaust gas catalyst. Preferably, the exhaust gas catalyst further comprises a flow-through substrate or filter substrate. In one embodiment, the first molecular sieve catalyst and the second molecular sieve catalyst are coated onto the flow-through or filter substrate, and preferably deposited on the flow-through or filter substrate using a washcoat procedure to produce the exhaust gas catalyst system.

Suitable flow-through or filter substrates are described above.

The first molecular sieve catalyst and the second molecular sieve catalyst may be added to the flow-through or filter substrate by any known means. A representative process for preparing the exhaust gas catalyst using a washcoat procedure is set forth below. It will be understood that the process below can be varied according to different embodiments of the invention. Also, the order of addition of the first molecular sieve catalyst and the second molecular sieve catalyst onto the flow-through or filter substrate is not considered critical. Thus, the first molecular sieve catalyst may be washcoated on the substrate prior to the second molecular sieve catalyst or the second molecular sieve catalyst may be washcoated on the substrate prior to the first molecular sieve catalyst or both the first molecular sieve catalyst and the second molecular sieve catalyst can be washcoated on the substrate simultaneously.

The pre-formed first molecular sieve catalyst may be added to the flow-through or filter substrate by a washcoating step. Alternatively, the first molecular sieve catalyst may be formed on the flow-through or filter substrate by first washcoating unmodified molecular sieve onto the substrate to produce a molecular sieve-coated substrate. Noble metal may then be added to the molecular sieve-coated substrate, which may be accomplished by an impregnation procedure, or the like.

The washcoating procedure is preferably performed as described above. Preferably, the entire length of the flow-through or filter substrate is coated with the first molecular sieve catalyst slurry so that a washcoat of the first molecular sieve catalyst covers the entire surface of the substrate.

After the flow-through or filter substrate has been coated with the first molecular sieve catalyst slurry, and impregnated with noble metal if necessary, the coated substrate is preferably dried and then calcined by heating at an elevated temperature to form the molecular sieve catalyst-coated substrate. Preferably, the calcination occurs at 400 to 600° C. for approximately 1 to 8 hours.

The washcoat addition of the second molecular sieve catalyst is preferably accomplished by the procedure described above. Preferably, the entire length of the flow-through or filter substrate is coated with the supported PGM catalyst slurry so that a washcoat of the supported PGM catalyst covers the entire surface of the substrate.

After the flow-through or filter substrate has been coated with the both the first and second molecular sieve catalyst slurries, it is preferably dried and then calcined by heating at an elevated temperature to produce the exhaust gas catalyst. Preferably, the calcination occurs at 400 to 600° C. for approximately 1 to 8 hours.

In an alternative embodiment, the flow-through or filter substrate is comprised of the first molecular sieve catalyst, the second molecular sieve catalyst, or both the first and second molecular sieve catalysts. In this case, the first, second, or both molecular sieve catalysts are extruded to form the flow-through or filter substrate. If not included in the extruded substrate, the first or second molecular sieve catalyst is coated onto the extruded flow-through or filter substrate. The extruded substrate is preferably a honeycomb flow-through monolith.

Preferably, the exhaust gas catalyst comprises a first layer comprising the first molecular sieve catalyst and a second layer comprising the second molecular sieve catalyst. Typically, the first layer may be disposed on a substrate and the second layer is disposed on the first layer. Alternatively, the second layer may be disposed on a substrate and the first layer disposed on the second layer.

In a separate embodiment, the exhaust gas catalyst comprises a first zone comprising the first molecular sieve catalyst and a second zone comprising the second molecular sieve catalyst. The first zone may be upstream of the second zone such that the first zone contacts the exhaust gas prior to the second zone, or alternatively the second zone may be upstream of the first zone such that the second zone contacts the exhaust gas prior to the first zone. Preferably, the second zone is located upstream of the first zone such that the exhaust gas contacts the second molecular sieve catalyst prior to contacting the first molecular sieve catalyst. The two zones may be on the same catalyst component (or catalyst brick), or the first zone comprising the first molecular sieve catalyst may be located on a separate brick (or catalyst component) than the second zone comprising the second molecular sieve catalyst.

The invention also includes an exhaust system for internal combustion engines comprising the exhaust gas catalyst. The exhaust system preferably comprises one or more additional after-treatment devices capable of removing pollutants from internal combustion engine exhaust gases at normal operating temperatures. Preferably, the exhaust system comprises the exhaust gas catalyst and one or more other catalyst components selected from: (1) a selective catalytic reduction (SCR) catalyst, (2) a particulate filter, (3) a SCR filter, (4) a $NO_x$ adsorber catalyst, (5) a three-way catalyst, (6) an oxidation catalyst, or any combination thereof. The exhaust gas catalyst is preferably a separate component from any of the above after-treatment devices. Alternatively, the exhaust gas catalyst can be incorporated as a component into any of the above after-treatment devices.

These after-treatment devices are well known in the art. Selective catalytic reduction (SCR) catalysts are catalysts that reduce $NO_x$ to $N_2$ by reaction with nitrogen compounds (such as ammonia or urea) or hydrocarbons (lean $NO_x$ reduction). A typical SCR catalyst is comprised of a vanadia-titania catalyst, a vanadia-tungsta-titania catalyst, or a metal/zeolite catalyst such as iron/beta zeolite, copper/beta zeolite, copper/SSZ-13, copper/SAPO-34, Fe/ZSM-5, or copper/ZSM-5.

Particulate filters are devices that reduce particulates from the exhaust of internal combustion engines. Particulate filters include catalyzed particulate filters and bare (non-catalyzed) particulate filters. Catalyzed particulate filters (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Selective catalytic reduction filters (SCRF) are single-substrate devices that combine the functionality of an SCR and particulate filter. They are used to reduce $NO_x$ and particulate emissions from internal combustion engines. In addition to the SCR catalyst coating, the particulate filter may also include other metal and metal oxide components (such as Pt, Pd, Fe, Mn, Cu, and ceria) to oxidize hydrocarbons and carbon monoxide in addition to destroying soot trapped by the filter.

$NO_x$ adsorber catalysts (NACs) are designed to adsorb $NO_x$ under lean exhaust conditions, release the adsorbed $NO_x$ under rich conditions, and reduce the released $NO_x$ to form $N_2$. NACs typically include a $NO_x$-storage component (e.g., Ba, Ca, Sr, Mg, K, Na, Li, Cs, La, Y, Pr, and Nd), an oxidation component (preferably Pt) and a reduction component (preferably Rh). These components are contained on one or more supports.

Three-way catalysts (TWCs) are typically used in gasoline engines under stoichiometric conditions in order to convert $NO_x$ to $N_2$, carbon monoxide to $CO_2$, and hydrocarbons to $CO_2$ and $H_2O$ on a single device.

Oxidation catalysts, and in particular diesel oxidation catalysts (DOCs), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

The exhaust system can be configured so that the exhaust gas catalyst is located close to the engine and the additional after-treatment device(s) are located downstream of the exhaust gas catalyst. Thus, under normal operating conditions, engine exhaust gas first flows through the exhaust gas catalyst prior to contacting the after-treatment device(s). Alternatively, the exhaust system may contain valves or other gas-directing means such that during the low temperature period (typically below a temperature ranging from about 150 to 250° C., preferably 200° C., about as measured at the after-treatment device(s)), the exhaust gas is directed to contact the after-treatment device(s) before flowing to the exhaust gas catalyst. Once the after-treatment device(s) reaches the operating temperature (about 150 to 250° C., preferably 200° C., as measured at the after-treatment device (s)), the exhaust gas flow is then redirected to contact the exhaust gas catalyst prior to contacting the after-treatment device(s). This ensures that the temperature of the exhaust gas catalyst remains low for a longer period of time, and thus improves efficiency of the exhaust gas catalyst, while simultaneously allowing the after-treatment device(s) to more quickly reach operating temperature. U.S. Pat. No. 5,656,244, the teachings of which are incorporated herein by reference, for example, teaches means for controlling the flow of the exhaust gas during cold-start and normal operating conditions.

The invention also includes a method for treating exhaust gas from an internal combustion engine. The method comprises adsorbing $NO_x$ and hydrocarbons (HC) onto the exhaust gas catalyst at temperatures at or below a low temperature, converting and thermally desorbing $NO_x$ and HC from the exhaust gas catalyst at a temperature above the low temperature, and catalytically removing the desorbed $NO_x$ and HC on a catalyst component downstream of the exhaust gas catalyst. Preferably, the low temperature is in the range of about 200° C. to 250° C., more preferably about 200° C.

The catalyst component downstream of the exhaust gas catalyst is a SCR catalyst, a particulate filter, a SCR filter, a $NO_x$ adsorber catalyst, a three-way catalyst, an oxidation catalyst, or combinations thereof.

The following examples merely illustrate the invention. Those skilled in the art will recognize many variations that are within the spirit of the invention and scope of the claims.

Example 1

Preparation of Noble Metal-Molecular Sieve Catalysts

Palladium is added to a variety of different molecular sieves according to the following general procedure: The powder catalyst is prepared by wet impregnation of the molecular sieve using palladium nitrate as the precursor. After drying at 100° C., the samples are calcined at 500° C. The samples are then hydrothermally aged at 750° C. in an air atmosphere containing 10% $H_2O$. The Pd loadings for all the samples are 1 wt. %. Examples of the molecular sieve supported Pd catalysts are listed in Table 1.

Example 2

Preparation of Comparative Catalyst

Comparative Catalyst 2A ($Pd/CeO_2$) is prepared following the procedures reported in WO 2008/047170 by impregnating Pd onto a $CeO_2$ support, and hydrothermally aged at 750° C. in an air atmosphere containing 10% $H_2O$. The Pd loading is 1 wt. %.

Example 3

$NO_x$ Storage Capacity Testing Procedures

The catalyst (0.4 g) is held at the adsorption temperature of about 80° C. for 2 minutes in an NO-containing gas mixture flowing at 2 liters per minute at a MHSV of 300 $L*hr^{-1}*g^{-1}$. This adsorption stage is followed by Temperature Programmed Desorption (TPD) at a ramping rate of 10° C./minute in the presence of the NO-containing gas until the bed temperature reaches about 400° C. in order to purge the catalyst of all stored $NO_x$ for further testing. The test is then repeated starting from a temperature of 100° C., instead of 80° C.; repeated again starting from a temperature of 150° C.; and repeated again starting from a temperature of 170° C.

The NO-containing gas mixture during both the adsorption and desorption comprises 12 vol. % $O_2$, 200 ppm NO, 5 vol. % $CO_2$, 200 ppm CO, 50 ppm $C_{10}H_{22}$, and 5 vol. % $H_2O$.

The $NO_x$ storage is calculated as the amount of $NO_2$ stored per liter of catalyst with reference to a monolith containing a catalyst loading of about 3 $g/in^3$. The results at the different temperatures are shown in Table 1.

The results at Table 1 show that all the molecular sieve supported catalysts, similar to the Comparative Catalyst 2A, can store $NO_x$ at low temperatures. In general, the small pore molecular sieve supported catalysts have higher $NO_x$ storage capacity at temperatures above 150° C.; whereas the large pore molecular sieve supported catalysts have higher $NO_x$ storage capacity at temperatures below 100° C.

Example 4

$NO_x$ Storage Capacity after Sulfur Exposure Testing Procedures

Exhaust gas catalysts 1E, 1H, and 1K, together with Comparative Catalyst 2A, are subjected to a high level of sulfation by contacting them with a $SO_2$ containing gas (100 ppm $SO_2$, 10% $O_2$, 5% $CO_2$ and $H_2O$, balance $N_2$) at 300° C. to add about 64 mg S per gram of catalyst. The $NO_x$ storage capacity of the catalysts before and after sulfation is measured at 100° C. following the procedures of Example 3. The results are listed in Table 2.

The results shown in Table 2 indicate that the exhaust gas catalysts of the invention retain a significant amount of the $NO_x$ storage capacity even after high a level of sulfur exposure. In contrast, Comparative Catalyst 2A ($Pd/CeO_2$) loses almost all of its $NO_x$ adsorption ability under the same sulfation conditions. The exhaust gas catalysts of the invention exhibits much improved sulfur tolerance.

Example 5

Preparation and Evaluation of Molecular Sieve Supported Catalysts with Different Palladium Loadings Palladium is added to different molecular sieves following the procedure of Example 1. The Pd loading is varied from 0.25 to 2 wt. %. The samples are hydrothermally aged at 750° C. in an air atmosphere containing 10% $H_2O$. The aged samples are then tested for their $NO_x$ storage capacities following the procedure of Example 3. The $NO_x$ storage capacities of the samples at various temperatures are listed in Table 3.

The results in Table 3 show that increasing Pd loading increases the $NO_x$ storage capacity.

Example 6

Preparation of Mixed Molecular Sieve Supported Palladium Catalysts

Molecular sieve supported palladium catalysts are first prepared individually following the procedures of Example 1. The catalysts are subsequently mixed with each other at an equivalent ratio based on their weight. The mixed catalysts are then hydrothermally aged at 750° C. in an air atmosphere containing 10% $H_2O$. Examples of the mixed catalysts are listed in Table 4.

Example 7

Evaluation of the Mixed Catalysts

Individual catalysts (0.2 g) and their mixtures (0.4 g) are held at the adsorption temperature of 80° C. for 1 minute in an NO-containing gas mixture flowing at 2 liters per minute at a MHSV of 300 $L*hr^{-1}*g^{-1}$. This adsorption stage is followed by Temperature Programmed Desorption (TPD) at a ramping rate of 100° C./minute in the presence of the NO-containing gas until the bed temperature reaches about 400° C. The NO-containing gas mixture during both the adsorption and desorption comprises 12 vol. % $O_2$, 200 ppm NO, 5 vol. % $CO_2$, 200 ppm CO, 50 ppm $C_{10}H_{22}$, and 5 vol. % $H_2O$.

The $NO_x$ storage capacities are calculated during the 1 minute holding at 80° C., as well as during the subsequent temperature ramping from 80 to 200° C. The results are summarized in Table 4.

The results in Table 4 show that it is possible to optimize the $NO_x$ storage capacity at different temperatures by combining different types of molecular sieve supported noble metal catalysts.

Example 8

Washcoating Molecular Sieve Supported Palladium Catalysts

Molecular sieve supported palladium catalyst powders are prepared following the procedure of Example 1. The Pd loadings are 1.4 wt. % for all the samples. Each of the powder samples is then slurried and mixed an alumina binder. The mixture is coated on a flow-through cordierite substrate to achieve a Pd loading of 50 g/ft³. The coated catalyst is dried and then calcined by heat at 500° C. for 4 hours. Examples of the catalysts are listed in Table 5.

Example 9

Washcoating Molecular Sieve Supported Palladium Catalysts Together with a Platinum Component The washcoated catalysts in Example 8 are further coated with a second layer of alumina supported Pt catalyst. Platinum nitrate is added to a water slurry of alumina particles (milled to an average particle size of less than 10 microns in diameter) to form a Pt/alumina catalyst slurry. The Pt/alumina catalyst slurry is then coated on the Pd/molecular sieve-coated substrate to achieve a Pt loading of 25 g/ft³, and the final coated substrate is dried, and then calcined by heating at 500° C. for 4 hours. Examples of the Pt-containing catalysts are also listed in Table 5.

Example 10

Washcoating Mixed Molecular Sieve Supported Palladium Catalysts

Molecular sieve supported palladium catalyst powders are prepared following the procedure of Example 1. The Pd loadings are 1.4 wt. % for all the samples. Two selected powder samples are then slurried and mixed with the weight ratio of 1:1, followed by the addition of alumina binder to the mixed slurry. This mixture is coated on a flow-through cordierite substrate to achieve a Pd loading of 50 g/ft³. The coated catalyst is dried and then calcined by heat at 500° C. for 4 hours. Examples of the catalysts are listed in Table 5.

Example 11

Washcoating Mixed Molecular Sieve Supported Palladium Catalysts Together with a Platinum Component The washcoated catalysts in Example 10 are further coated with a second layer of alumina supported Pt catalyst. Platinum nitrate is added to a water slurry of alumina particles (milled to an average particle size of less than 10 microns in diameter) to form a Pt/alumina catalyst slurry. The Pt/alumina catalyst slurry is then coated on the Pd/molecular sieve-coated substrate to achieve a Pt loading of 25 g/ft³, and the final coated substrate is dried, and then calcined by heating at 500° C. for 4 hours. Examples of the Pt-containing catalysts are also listed in Table 5.

Example 12

Evaluation of the Washcoated Catalysts

All the washcoated catalysts are tested on core samples (2.54 cm in diameter×7.62 cm in length) of the flow-through catalyst-coated cordierite substrate. Catalyst cores are first aged under flow-through conditions in a furnace under hydrothermal conditions (5% $H_2O$, balance air) at 750° C. for 16 hours. The cores are then tested for catalytic activity in a laboratory reactor, using a feed gas stream that is prepared by adjusting the mass flow of the individual exhaust gas components. The gas flow rate is maintained at 21.2 L min$^{-1}$ resulting in a Gas Hourly Space Velocity of 30,000 h$^{-1}$ (GHSV=30,000 h$^{-1}$).

The catalysts are tested under lean conditions, using a synthetic exhaust gas feed stream consisting of 200 ppm NO, 200 ppm CO, 50 ppm decane, 10% $O_2$, 5% $CO_2$, 5% $H_2O$ and the balance nitrogen (volume %). The catalyst is exposed to the feed gas stream, first at an isothermal inlet gas temperature of 80° C. for 100 seconds, following which the inlet gas temperature is increased to 650° C. with a ramp rate of 100° C./min.

The $NO_x$ storage capacities of the catalysts at 80° C. for 100 seconds and during the subsequent temperature ramp from 80 to 200° C. are summarized in Table 5. The cumulative HC storage and conversion efficiency and the cumulative CO conversion efficiency of the catalyst at temperatures below 200° C. are also summarized in Table 5.

The results in Table 5 show that large pore molecular sieve supported catalysts have higher $NO_x$ storage capacity at low temperatures; whereas small pore molecular sieve supported catalysts have higher $NO_x$ storage capacity at higher temperatures. The large pore molecular sieve supported catalysts also exhibit higher HC storage and conversion efficiency. Comparing the results on the mixed catalysts versus the catalysts with the corresponding single type of molecular sieve component, the mixed catalysts in general maintain high $NO_x$ storage capacity in a wider temperature window.

Example 13

Evaluation of Zoned Catalysts

Zoned catalyst systems are evaluated by combining a half of the core length of a Pd/BEA bottom and Pt/$Al_2O_3$ top catalyst prepared in Example 9C and a half of the core length of a Pd/CHA bottom and Pt/$Al_2O_3$ top catalyst prepared in Example 9A. The Example 13A system places a half of the core of Example 9C in front of a half of the core of Example 9A; whereas the Example 13B system places a half of the core of Example 9A in front of a half of the core of Example 9C. These systems are evaluated following the same procedures as outlined in Example 12. The evaluation results are summarized in Table 5.

The results in Table 5 show that the zoned systems, especially Example 11A, exhibit high $NO_x$ storage capacities in a much wider temperature range than the corresponding individual catalysts.

TABLE 1

NO$_x$ storage capacity (g NO$_2$/L)

| Catalyst | Molecular sieve | NO$_x$ storage capacity at different temperatures (g NO$_2$/L) | | | |
|---|---|---|---|---|---|
| | | 80° C. | 100° C. | 150° C. | 170° C. |
| 1A | CHA (SAR = 12) | 0.42 | 0.50 | 0.62 | 0.60 |
| 1B | CHA (SAR = 13) | 0.34 | 0.43 | 0.52 | 0.51 |
| 1C | CHA (SAR = 17) | 0.20 | 0.36 | 0.42 | 0.42 |
| 1D | CHA (SAR = 22) | 0.28 | 0.39 | 0.43 | 0.42 |
| 1E | CHA (SAR = 26) | 0.28 | 0.41 | 0.43 | 0.45 |
| 1F | AEI (SAR = 20) | 0.33 | 0.46 | 0.60 | 0.57 |
| 1G | ERI (SAR = 12) | 0.08 | 0.21 | 0.22 | 0.20 |
| 1H | MFI (SAR = 23) | 0.35 | 0.49 | 0.41 | 0.28 |
| 1J | FER (SAR = 18) | 0.16 | 0.19 | 0.08 | 0.07 |
| 1K | BEA (SAR = 28) | 0.68 | 0.53 | 0.14 | 0.07 |
| 1L | BEA (SAR = 37) | 0.33 | 0.38 | 0.01 | NM* |
| 1M | FAU (SAR = 30) | 0.11 | 0.10 | 0.12 | 0.14 |
| 1N | MOR (SAR = 30) | 0.07 | 0.06 | NM* | NM* |
| 1P | CHA (SAPO-34) | 0.29 | 0.34 | 0.40 | 0.41 |
| 1Q | AEI-CHA (SAPO) | 0.22 | 0.22 | 0.25 | 0.23 |
| 2A** | —(Pd/CeO$_2$) | 0.29 | 0.31 | 0.41 | 0.38 |

*NM: not measured
**Comparative Example

TABLE 2

NO$_x$ storage capacity (g NO$_2$/L)

| Catalyst | NO$_x$ storage capacity at 100° C. before sulfation | NO$_x$ storage capacity at 100° C. after sulfation |
|---|---|---|
| 1E | 0.41 | 0.28 |
| 1H | 0.49 | 0.40 |
| 1K | 0.53 | 0.47 |
| 2A* | 0.31 | 0.01 |

*Comparative Example

TABLE 3

NO$_x$ storage capacity (g NO$_2$/L)

| Catalyst | Molecular sieve | Pd loading (wt. %) | NO$_x$ storage capacity at different temperatures (g NO$_2$/L) | | | |
|---|---|---|---|---|---|---|
| | | | 80° C. | 100° C. | 150° C. | 170° C. |
| 1E | CHA (SAR = 26) | 1 | 0.28 | 0.41 | 0.43 | 0.45 |
| 5A | CHA (SAR = 26) | 2 | 0.43 | 0.60 | 0.67 | 0.66 |
| 1K | BEA (SAR = 28) | 1 | 0.68 | 0.53 | 0.14 | 0.07 |
| 5B | BEA (SAR = 28) | 0.75 | 0.63 | NM* | NM* | NM* |
| 5C | BEA (SAR = 28) | 0.50 | 0.50 | NM* | NM* | NM* |
| 5D | BEA (SAR = 28) | 0.25 | 0.31 | NM* | NM* | NM* |

*NM: not measured

TABLE 4

NO$_x$ storage capacity (g NO$_2$/L)

| Catalyst | Molecular sieve | 1 minute at 80° C. | During ramp from 80 to 200° C. |
|---|---|---|---|
| 1E | CHA (SAR = 26) | 0.23 | 0.09 |
| 1F | AEI (SAR = 20) | 0.29 | 0.13 |
| 1H | MFI (SAR = 23) | 0.25 | 0.07 |
| 1K | BEA (SAR = 28) | 0.38 | −0.08 |
| 6A | 1E + 1H | 0.17 | 0.13 |
| 6B | 1F + 1H | 0.18 | 0.21 |
| 6C | 1E + 1K | 0.17 | 0.17 |
| 6D | 1F + 1K | 0.17 | 0.20 |
| 6E | 1H + 1K | 0.18 | 0.16 |

TABLE 5

Evaluation of washcoated catalysts

| Catalyst | Molecular sieve | NO$_x$ storage capacity at 80° C. (g NO$_2$/L) | NO$_x$ storage capacity during ramp from 80 to 200° C. (g NO$_2$/L) | Cumulative HC storage and conversion efficiency below 200° C. (%) | Cumulative CO conversion efficiency below 200° C. (%) |
|---|---|---|---|---|---|
| 8A | Pd/CHA | 0.21 | 0.33 | 26 | 46 |
| 8B | Pd/MFI | 0.19 | 0.26 | 95 | 28 |
| 8C | Pd/BEA | 0.33 | 0.29 | 96 | 39 |
| 9A | Pd/CHA with Pt/Al$_2$O$_3$ | 0.19 | 0.28 | 46 | 47 |
| 9B | Pd/MFI with Pt/Al$_2$O$_3$ | 0.18 | 0.12 | 97 | 29 |
| 9C | Pd/BEA with Pt/Al$_2$O$_3$ | 0.33 | −0.02 | 98 | 50 |
| 10A | Pd/BEA + Pd/MFI | 0.27 | 0.16 | 96 | 35 |
| 10B | Pd/BEA + Pd/CHA | 0.29 | 0.22 | 97 | 42 |
| 11A | (Pd/BEA + Pd/MFI) w/ Pt/Al$_2$O$_3$ | 0.28 | −0.01 | 98 | 46 |
| 11B | (Pd/BEA + Pd/CHA) w/ Pt/Al$_2$O$_3$ | 0.27 | 0.10 | 97 | 46 |
| 13A | ½ 9C + ½ 9A | 0.30 | 0.12 | 89 | 54 |
| 13B | ½ 9A + ½ 9C | 0.23 | 0.07 | 88 | 44 |

We claim:

1. An exhaust gas catalyst effective to adsorb NO$_x$ and hydrocarbons (HC) at or below a low temperature and to convert and release the adsorbed NO$_x$ and HC at temperatures above the low temperature, said exhaust gas catalyst comprising a first molecular sieve catalyst and a second molecular sieve catalyst, wherein the first molecular sieve catalyst comprises a first noble metal and a first molecular sieve, and the second molecular sieve catalyst comprises a second noble metal and a second molecular sieve, wherein the first molecular sieve is different than the second molecular sieve, and wherein greater than 5 percent of the total amount of first noble metal is located inside pores of the first molecular sieve and greater than 5 percent of the total amount of second noble metal is located inside pores of the second molecular sieve.

2. The exhaust gas catalyst of claim 1 wherein the first noble metal and the second noble metal are independently selected from the group consisting of platinum, palladium, rhodium, gold, silver, iridium, ruthenium, osmium, and mixtures thereof.

3. The exhaust gas catalyst of claim 2 wherein the first noble metal and the second noble metal are both palladium.

4. The exhaust gas catalyst of claim 1 wherein the first molecular sieve is a small pore molecular sieve selected from the group of Framework Type consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG AND ZON, and intergrowths of two or more.

5. The exhaust gas catalyst of claim 4 wherein the small pore molecular sieve is selected from the group Framework Type consisting of AEI and CHA.

6. The exhaust gas catalyst of claim 1 wherein the second molecular sieve is a medium or large pore molecular sieve selected from the group consisting of BEA and MFI.

7. The exhaust gas catalyst of claim 1 wherein the exhaust gas catalyst is coated onto a flow-through or filter substrate.

8. The exhaust gas catalyst of claim 1 wherein the exhaust gas catalyst is extruded to form a flow-through or filter substrate.

9. The exhaust gas catalyst of claim 1 wherein the exhaust gas catalyst comprises a first layer comprising the first molecular sieve catalyst and a second layer comprising the second molecular sieve catalyst.

10. The exhaust gas catalyst of claim 1 wherein the exhaust gas catalyst comprises a first zone comprising the first molecular sieve catalyst and a second zone comprising the second molecular sieve catalyst.

11. The exhaust gas catalyst of claim 10 wherein the first zone comprising the first molecular sieve catalyst is located on a separate brick than the second zone comprising the second molecular sieve catalyst.

12. An exhaust system for internal combustion engines comprising the exhaust gas catalyst of claim 1 and a catalyst component selected from the group consisting a selective catalytic reduction (SCR) catalyst, a particulate filter, a SCR filter, a $NO_x$ adsorber catalyst, a three-way catalyst, an oxidation catalyst, and combinations thereof.

13. A method for treating an exhaust gas from an internal combustion engine, said method comprising adsorbing $NO_x$ and hydrocarbons (HC) onto the exhaust gas catalyst of claim 1 at or below a low temperature, converting and thermally desorbing $NO_x$ and HC from the exhaust gas catalyst at a temperature above the low temperature, and catalytically removing the desorbed $NO_x$ and HC on a catalyst component downstream of the exhaust gas catalyst.

14. The method of claim 13 wherein the low temperature is in the range of 200° C. to 250° C.

15. The method of claim 13 wherein the second molecular sieve catalyst is located upstream of the first molecular sieve catalyst so that the exhaust gas contacts the second molecular sieve catalyst prior to contacting the first molecular sieve catalyst.

16. An exhaust gas catalyst effective to adsorb $NO_x$ and hydrocarbons (HC) at or below a low temperature and to convert and release the adsorbed $NO_x$ and HC at temperatures above the low temperature, said exhaust gas catalyst comprising a first molecular sieve catalyst having a first noble metal and a first molecular sieve selected from CHA, AEI, and an AEI-CHA intergrowth, and a second molecular sieve catalyst having a second noble metal and a second molecular sieve selected from BEA and MFI.

* * * * *